United States Patent [19]

Oku

[11] 4,109,130
[45] Aug. 22, 1978

[54] ELECTRIC WELDER OUTPUT CONTROL DEVICE

[75] Inventor: Takeshi Oku, Kawanishi, Japan

[73] Assignee: Matsushita Electric Industrial Co., Ltd., Osaka, Japan

[21] Appl. No.: 679,976

[22] Filed: Apr. 26, 1976

Related U.S. Application Data

[63] Continuation-in-part of Ser. No. 481,070, Jun. 20, 1974, abandoned, which is a continuation-in-part of Ser. No. 310,698, Nov. 30, 1972, abandoned.

[30] Foreign Application Priority Data

Nov. 30, 1971 [JP] Japan .................................. 46-96998
Nov. 30, 1971 [JP] Japan .................................. 46-97001

[51] Int. Cl.² ............................................. B23K 9/10
[52] U.S. Cl. ............................ 219/130.21; 219/130.5
[58] Field of Search ............ 219/131 R, 131 WR, 135

[56] References Cited

U.S. PATENT DOCUMENTS

| | | | |
|---|---|---|---|
| 3,384,785 | 5/1968 | Thomas, Jr. ................. | 219/131 WR |
| 3,530,359 | 9/1970 | Grist ................................ | 219/135 |
| 3,549,979 | 12/1970 | Stearns et al. ..................... | 219/135 |
| 3,588,466 | 6/1971 | Daggett .............................. | 219/135 |
| 3,774,007 | 11/1973 | Chiasson et al. ................. | 219/131 R |
| 3,781,640 | 12/1973 | Toth .................................. | 219/131 R |
| 3,896,287 | 7/1975 | Cook .................................. | 219/131 R |
| 3,912,980 | 10/1975 | Crump et al. ................. | 219/131 WR |
| 3,928,746 | 12/1975 | Ericsson ................................ | 219/135 |
| 3,961,154 | 6/1976 | Ericsson ....................... | 219/131 WR |
| 3,974,436 | 8/1976 | Timpe .......................... | 219/131 WR |

Primary Examiner—J. V. Truhe
Assistant Examiner—Clifford C. Shaw
Attorney, Agent, or Firm—Burgess, Ryan and Wayne

[57] ABSTRACT

A welding control circuit comprises a differential type operational amplifier preferably having at least first, second and third input terminals. A signal $S_1$ corresponding to the desired output of an electric welder to be controlled is applied to the first input terminal of the amplifier; a signal $S_0$ for setting the output of the welder to initially approximate the desired output is applied to the second input terminal of the amplifier; and a feedback signal $S_2$ is applied from the welder to the third input of the amplifier. The circuit constants of the adder-subtractor circuit are selected so that the ratio of the output S of the adder-subtractor circuit to the input signal $S_0$ is $a$ (in the absence of other input signals) whereas the ratio of the output S to the input signals $S_1$ and $S_2$ is $b$ (in the absence of other input signals). The adder-subtractor circuit is connected so that its output is given by $S = aS_0 + b(S_1 - S_2)$.

2 Claims, 3 Drawing Figures

ELECTRIC WELDER OUTPUT CONTROL DEVICE

This application is a continuation-in-part of application Ser. No. 481,070 filed June 20, 1974, now abandoned which was a continuation-in-part of application Ser. No. 310,698, filed Nov. 30, 1972, now abandoned.

The present invention relates to a device for controlling the output of an electric welder.

In a conventional control system used for controlling the output of an electric welder, a controller means is coupled both to a signal source for setting the output of the welder and to the welder, the output of the welder being coupled to a welding load. Since the output of the welder is controlled only in response to the signal from the signal source, the control system is simple in construction and operation, but is easily susceptible to the influence of fluctuations in voltage applied to the welder. Therefore, it is difficult to maintain a desired output level in a stable manner.

Variation in the output of electric welders is caused by various factors under various conditions so that adequate control of the output cannot be effected merely be negatively feeding back the output of the welder to the output setting signal source.

One of the objects of the present invention is therefore to provide an electric welder output control device which controls the output of the welder in a stable and dependable manner.

Another object of the present invention is to provide an electric welder output control device which controls the output of the welder in a stable and dependable manner even when a plurality of control signals are simultaneously applied.

Briefly stated, an electric welder output control device in accordance with the present invention includes an adder-subtractor circuit which comprises a differential type operational amplifier and has at least three input terminals. A signal $S_1$ corresponding to the desired output of the welder is applied to the first input terminal; a signal $S_0$ for setting the output of the operational amplifier to conditions which approximate the desired amplifier output during operation of the welder is applied to the second input terminal; and the feedback signal $S_2$ from the welder is applied to the third input terminal. The circuit constants of the adder-subtractor circuit are so selected that the ratio of the output S of the adder-subtractor circuit in response to the input signal $S_0$ which is applied to the second input terminal and is less than a threshold value at which the operational amplifier is saturated is $a$, (i.e. in the absence of other input signals), whereas the ratio of the output S responsive to the input signals $S_1$ and $S_2$ applied to the first and third input terminals respectively is $b$ (i.e. in the absence of other input signals). The adder-subtractor circuit is further connected so that its output $S = aS_0 + b(S_1 - S_2)$.

In order to ensure more stable and dependable operation, delay means may be interconnected between the adder-subtractor circuit and a controller means, and a feedback signal smoothing circuit means may be inserted in a feedback loop.

According to the preferred embodiment of the present invention the output "indicating" signal $S_1$, the output setting signal $S_0$, the feedback signal $S_2$ and other control signals are applied to the input terminals of an adder-subtractor circuit in the form of a differential type operational amplifier. The feedback signal $S_2$ directly cancels the signal $S_1$ corresponding to the desired output and the output S of the welder is controlled in response to the output setting signal or reference signal $S_0$ so that the operation may become more stable and dependable as compared with conventional control systems of the type in which a feedback loop is not provided, or in which the feedback signal is directly fed back to the output setting signal source.

The above and other objects, features and advantages of the present invention will become more apparent from the following description of the preferred embodiments thereof taken in conjunction with the accompanying drawing.

Figure 1:
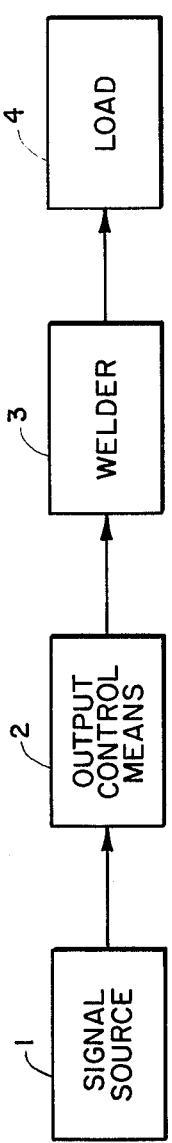
FIG. 1 is a block diagram of a prior art system for controlling the output of an electric welder.

Prior Art, FIG. 1.

FIG. 1 is a block diagram of a prior art welder control circuit which generally comprises a set signal source 1 of a signal $S_0$ for setting the output of the welder to conditions which approximate the desired output, and output control means 2 which may be for example a variable impedance reactor or saturable reactor in a power source means for an electric arc welder, a welder 3 and a load 4. The prior art control circuit is simple in that the output of the welder 3 is controlled in response to the output $S_0$ of the signal source 1, but has the disadvantage that the desired stable output of the welder cannot be constantly maintained with variations in the voltage of the power source and in the welding load.

Figure 2:
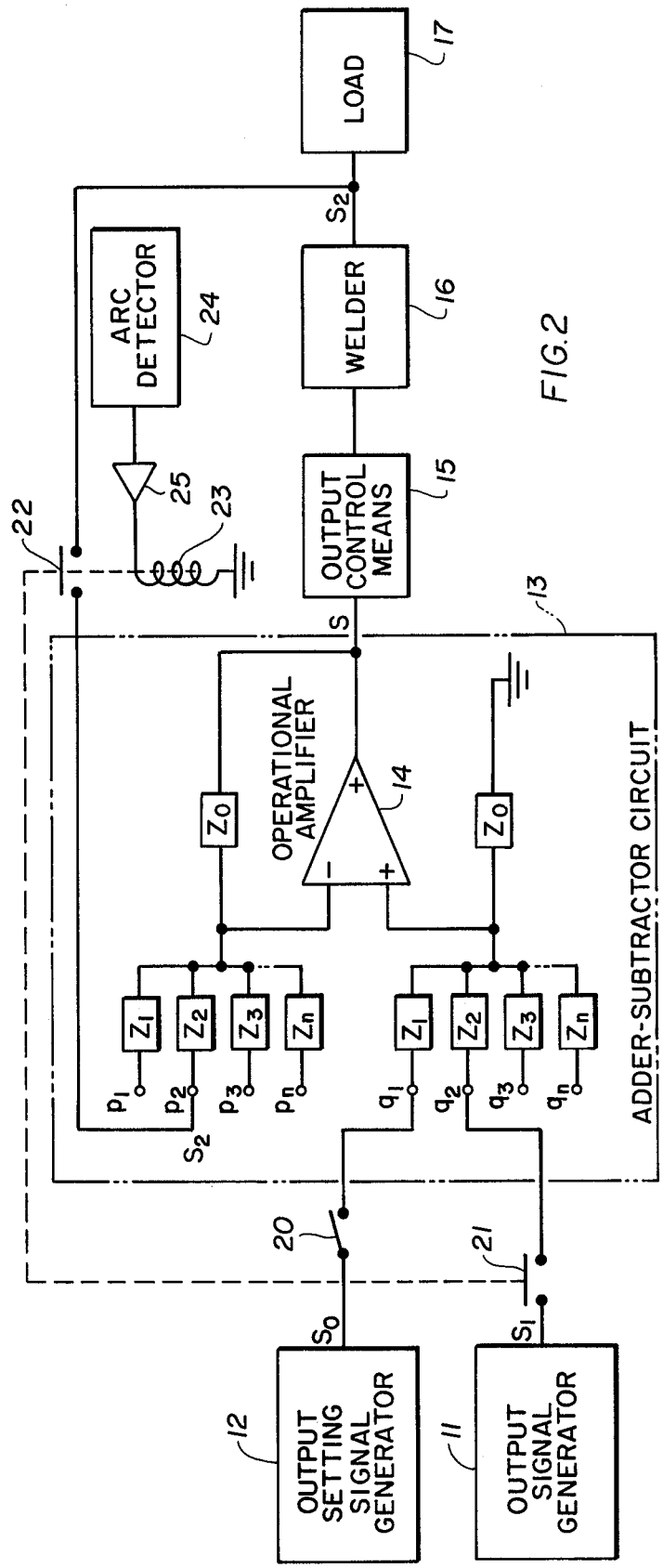
FIG. 2 is a circuit diagram of a first embodiment of an electric welder output control device in accordance with the present invention.

First Embodiment, FIG. 2.

Referring to FIG. 2, the first embodiment of a welder control circuit in accordance with the present invention generally comprises a signal generator 11 for generating a signal $S_1$ representative of a desired output of a welder, and an output setting signal $S_0$. These signals are applied to output control means 15 by way of an adder-subtractor circuit 13. The adder-subtractor circuit 13 comprises a differential type operational amplifier 14. The controller or output control means 15 for controlling the output of welder 16 is similar to the output control means 2 shown in FIG. 1. A welding load 17 is connected to the output of the welder 16.

The operational amplifier 14 has a first group of input terminals $P_1 - P_n$ coupled to the subtracting input of the amplifier by way of impedances $Z_1 - Z_n$ respectively, with a feedback impedance $Z_o$, and a second group of input terminals $q_1 - q_n$ coupled to the operational amplifier 14 through impedance means $Z_1 - Z_n$ respectively, with parallel impedance $Z_o$. The impedance may be electrical resistance means. Assuming that voltage signals $Sp_1 - Sp_n$ are impressed to the input terminals $P_1 - P_n$ respectively and similarly the voltage signals $Sq_1 - Sq_n$, to the input terminals $q_1 - q_n$ respectively, and that the operational amplifier 14 is not saturated, the output S will be:

$$S = \sum_{n=1}^{n} (Z_0/Z_n)Sq_n - \sum_{n=1}^{n} (Z_0/Z_n)Sp_n \qquad (1)$$

The output setting signal $S_0$ from the signal generator 12 is selectively applied to one of the non-inverting input terminals $q_n$, for example, the terminal $q_1$ as illustrated, by way of a manually operable switch 20. The signal $S_1$ is also applied to one of the non-inverting input terminals $q_n$, such as the terminal $q_2$ as illustrated, by way of contact 21. The output $S_2$ is applied to a selected inverting input $p_n$ of the operational amplifier, for example the input $p_2$ as illustrated, by way of the contact 22. The contacts 21 and 22 are operated simultaneously, and may comprise, for example, the contacts of a relay 23. In accordance with the invention, the contacts 21 and 22 are initially open, before the welding arc is struck, and these contacts are simultaneously closed when the arc is struck. For this purpose, an arc detector 24 is provided, the output of the arc detector 24 being employed to energize the relay 23, if necessary by way of an amplifier 25. The arc detector 24 may be of any conventional construction. For example, it may consist of an optical detection system responsive to the emission of light from a struck arc for producing an electric signal for energizing the relay 23. It will of course be apparent that the application of the signals $S_1$ and $S_2$ to the operational amplifier may be effected by other forms of control switches, such as solid state switches.

Next, the mode of operation will be described. Prior to a welding operation, the output setting signal generator 12 is set to provide a value of $S_0$ at the input of the operational amplifier that corresponds to approximately the desired welder output in the absence of the signals $S_1$ and $S_2$. The output signal generator 11 is set so that its output $S_1$ corresponds to the desired welder output, under operating conditions. Under initial conditions, before the arc has been struck, the contacts 21 and 22 are hence open, and the switch 20 is manually closed. Consequently, before the arc is struck, the output S of the operational amplifier circuit, which is applied to the output control means 15, corresponds to $AS_0$. At the moment the arc is struck and the output signal $S_2$ is produced, the contacts 21 and 22 are simultaneously closed, so that the welder will then operate steadily under the condition:
$S = AS_0 + B(S_1 - S_2)$ In the following discussion, it is assumed that the signal $S_1$ representative of the desired welder output from the signal generator 11 is applied to the input terminal (a first terminal) $q_2$, and that the output setting signal $S_0$ from the signal generator 12 is applied to the input terminal $q_2$ (the second input terminal). The feedback signal $S_2$ is applied to the input terminal $p_2$ (the third input terminal) of the operational amplifier 14. In this case, in accordance with Eq. (1), the output from the operational amplifier is given by:

$$S + (Z_0/Z_1)S_0 + (Z_0/Z_2)S_1 - (Z_0/Z_2)S_2 = (Z_0/Z_1)S_0 + (Z_0/Z_2)(S_1 - S_2) \qquad (2)$$

Eq. (2) can be rewritten in the form:

$$S = aS_0 + b(S_1 - S_2) \qquad (3)$$

where $a = Z_0/Z_1$, and
$b = Z_0/Z_2$.

It is of course also apparent that $a = S/S_0$ in the absence of amplifier inputs other than $S_0$, and that $b = S/S_1$ and $b = S/S_2$ in the absence of inputs other than $S_1$ and $S_2$ respectively, in accordance with conventional operational amplifier theory.

The output S of the operational amplifier 14 is impressed on the welder output control means 15 so as to control the output of the welder 16. That is, when the actual output of the welder 16 coincides with the desired set point, that is when $S_1 = S_2$, the output S given by Eq. (3) becomes $aS_0$, so that the output of the welder 16 is determined primarily in response to the signal $S_0$.

When the actual output $S_2$ of the welder 16 becomes $S_2 \pm \Delta S_2$ under the influence of an external factor such as variation in voltage applied to the welder 16, the output S of the operational amplifier is given by $$S = aS_0 + b(S_1 - (S_2 + \Delta S_2)) \qquad (4)$$

Therefore the output of the welder 16 may be compensated depending upon the difference ($\mp b \times \Delta S_2$) between Eqs. (3) and (4).

In a control system where the output of the welder 16 increases with increase of the signal S, for the deviation of $+ \Delta S_2$ the correction signal $\mp b \times \Delta S_2$ is applied to the welder output control means 16, that is, the absolute value of the deviation $|\Delta S_2|$ multiplied by $b$ with an opposite sign or polarity so that the deviation $\Delta S_2$ may be eliminated. It is seen that when the constant $b$ has a sufficiently high value, a sufficiently high correction signal $b \times \Delta S_2$ may be derived even for a very small deviation $\Delta S_2$ and applied to the control means 15 so that the variation in actual output of the welder 16 may become negligible in practice. Thus, the stable output control of the welder 16 may be attained.

The principle of operation of the present invention will perhaps be clearer if one considers initially the signals in the circuit in the absence of the setting signal $S_0$. In this case, it is apparent that:

$$S = b(S_1 - S_2) = b \Delta S \qquad (5)$$

When the factor $b$ is large, $S_2$ is controlled to closely approach $S_1$. If such control is employed in a welding device, and assuming that the signal $S_2$ is proportional to welding current, then during periods of non-welding, when welding current becomes zero, $S_2$ will also become zero. As a consequence, the relationship (5) cannot be satisfied, and a stabilized state cannot be obtained in the welding circuit during both welding and non-welding operations solely by the use of the control signal $S_1$.

Consequently, in accordance with the invention, the setting signal $S_0$ is applied to the system in addition to the signal $S_1$, for the purpose of setting the welder to supply initial welding current which is close to the desired value under the initial conditions.

Thus, in an electric welder controlled in accordance with the invention, the actual output of the welder will not be the actual value of the output of the setting signal generator 12. For example, if the output of the signal generator 12 is set to a voltage corresponding to the 30 volt point of the welder, the output of the welder 16 will not initially be at 30 volts. This is due to the fact that the output $S_2$ of the welder is determined only after the start of the welding operation. The signal $S_0$ is not set to obtain the desired 30 volt output from the welder, but instead it is set for obtaining approximately a 30 volt output of the welder. The signal will vary in accordance with the design of the output control means 15, the adder-subtractor circuit 13, and the welder 16. In other words, when a thyristor is employed in the output control means 15, the signal $S_0$ is the required signal for controlling the firing angle of the thyristor so that the output of the welder will be approximately 30 volts.

The output signal generator 11, however, is set to provide an output equal to the desired output voltage, i.e., in the above example, 30 volts. In the absence of the voltage $S_1$, if the setting generator 12 is manually adjusted so that the output S of the amplifier controls the output control means to provide approximately a 30 volt output, then it is apparent that the output $S_2$ of the welder fed back to the operational amplifier will effect a reduction in the output voltage. This effect is compensated by the provision of the signal generator 11, which compensates the signal $S_0$ in accordance with the difference between the desired voltage $S_1$ and the output voltage $S_2$.

In accordance with the invention then, it is apparent that the output setting signal generator 12 is set to provide an output voltage which, in the absence of other inputs $S_1$ and $S_2$ of the circuit would provide approximately the desired output from the welder, and that the output signal generator 11 is set to provide a voltage equal to the desired output voltage, so that the difference of the voltages $S_1$ and $S_2$ is zero.

It will be apparent, of course, that the different inputs of the operational amplifier may be employed as desired, with respect to the above described signals, in accordance with the well known principles of operation of operational amplifiers. For example, it is apparent that the relationship between the signals $S_1$ and $S_2$ is such that the signal appearing at the subtracting input of the operational amplifier due to the signal $S_2$ must equal the signal appearing at the additive terminal of the operational amplifier due to the signal $S_1$ when the signal $S_2$ has the desired amplitude. It is apparent that the $p$ and $q$ terminals of the adder-subtractor circuit to which the signals $S_2$ and $S_1$ are applied respectively may be selected to effect the cancellation of the signals $S_1$ and $S_2$ at the operational amplifier under the desired conditions. Consequently, it is not necessary that the voltages $S_1$ and $S_2$ be equal, as applied to the input terminals $q_n$ and $p_n$ respectively, when the output $S_2$ has the desired value, as long as the input terminals $p$ and $q$ are selected to achieve the cancellation at the input of the amplifier. It will thus be apparent, that when reference is made hereinafter to the setting of the output signal generator 11 to the desired actual output voltage, it is meant that the signal generator 11 is set to a voltage such that the proportion of this voltage appearing at the input of the amplifier is equal to the proportion of the voltage $S_2$ appearing at the input of the amplifier when the voltage $S_2$ is equal to the desired welder output voltage.

Similarly, it will be apparent that the output setting signal generator 12 may be connected to other input terminals $q_n$ of the adder-subtractor circuit, in dependence upon the desired amplification factor for this signal, the voltage output of the setting signal generator 12 of course being set in any case, in dependence upon the input of the adder-subtractor circuit to which it is connected, so that the control means 15 is controlled to provide approximately the desired welder output.

In addition, it will be apparent that the various input terminals $p_n$ and $q_n$ may also be employed for the compensation of other outside disturbances, in which case suitable signals are provided for application to such terminals. In the illustrated embodiment of the invention, a voltage signal equivalent to the welding current during welding (i.e. signal $S_2$) was applied to terminal $p_2$, a voltage signal corresponding to the desired welding current (i.e. signal $S_1$) of, for example, 300 amperes was supplied to the terminal $q_2$, and the welding electrode supply speed control signal for maintaining welding current, of for example, 300 amps, was applied to the terminal $q_1$. If desired, a voltage signal equivalent to quantity of penetration during welding may be applied to the terminal $p_3$, and a signal corresponding to the desired quantity of penetration may be applied to the terminal $q_3$. Other control signals may be applied to the terminals $p_n$ and $q_n$ as desired, with signals corresponding to actual occurrences being applied to the terminals $p_n$ and the signals indicating desired values of various welding components being applied to the terminals $q_n$.

SECOND EMBODIMENT, FIG. 3.

Figure 3:
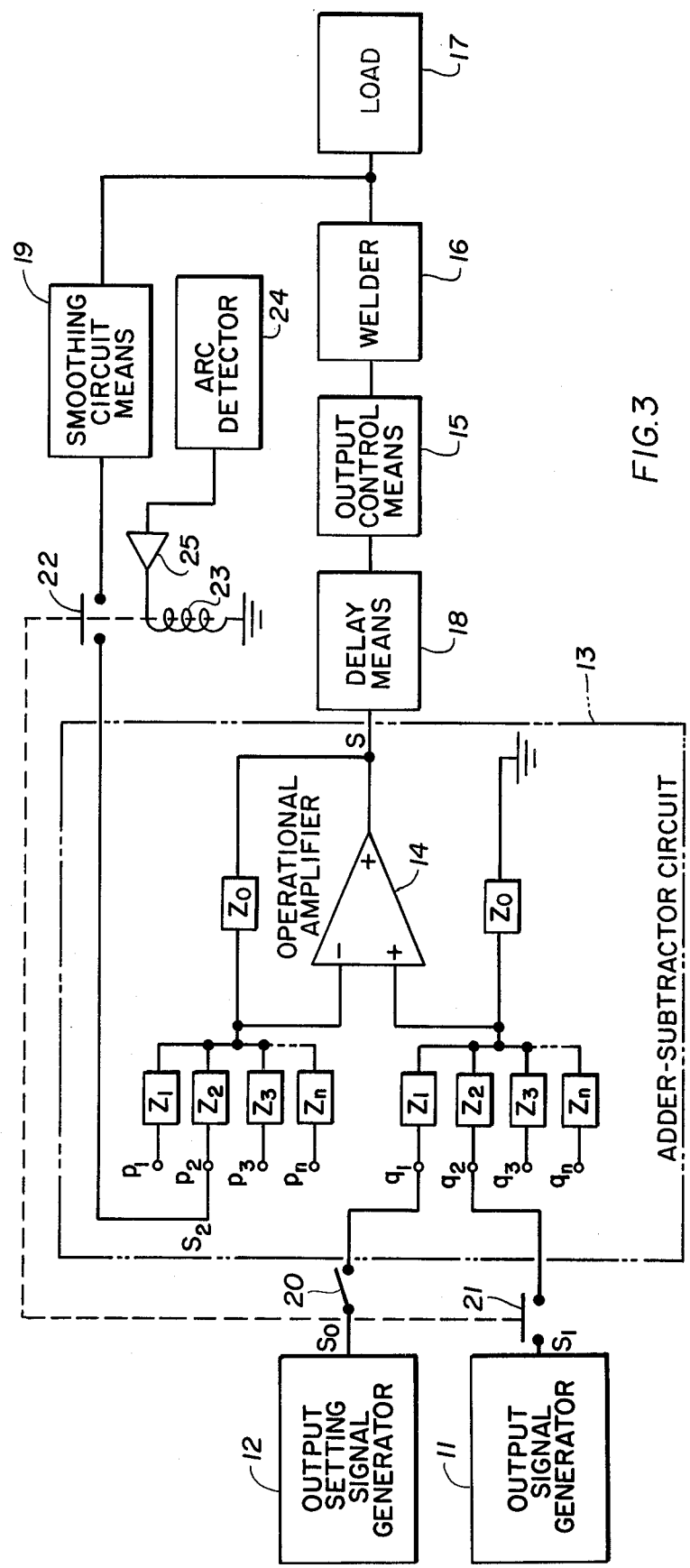
FIG. 3 is a circuit diagram of a second embodiment of an electric welder output control in accordance with the present invention.

The second embodiment shown in FIG. 3 is an improvement of the control device shown in FIG. 2 and further comprises delay means 18 interconnected between the operational amplifier 14 and the controller means 15 for delaying the signal S to be applied to the control means 15, and a signal smoothing means 19 inserted in the feedback loop in order to smooth the pulsating feedback signal $S_2$. Eqs. (1) – (4) discussed above are also applicable in the second embodiment.

Even though the average feedback signal $S_2$ coincides with the signal $S_1$ so that the output of the welder 16 is maintained at a desired level, the feedback signal $S_2$ includes a pulsation or deviation $\pm \Delta S_2'$ due to the electrical characteristics of the welder 16 and the properties of the welding load 17. Therefore for the pulsation $\pm \Delta S_2'$ of the feedback signal $S_2$ the output $\mp b \times \Delta S_2'$ of the operational amplifier 14 is also applied to the control means 15 as an error signal in addition to the error signal $\mp b \times \Delta S_2$ applied to the control means 15 in response to the deviation signal $\pm \Delta S_2$. This means that even when the deviation signal $\pm \Delta S_2 = 0$ and the output of the welder 16 is maintained at a desired level, the error signal $\mp b \times \Delta S_2'$ is applied to the control means 15. In order to overcome this problem the smoothing circuit means 19 is interposed in the feedback loop. The feedback signal $S_2$ is smoothed by the smoothing circuit means 19 and the pulsation $\pm \Delta S_2'$ is integrated in time so that only the actual deviation signal $\Delta S_2$ may be derived. In practice the above method is applied when the rate of the change in time of the deviation $\Delta S_2$ is slower than that of the pulsation $\Delta S_2'$.

The smoothing circuit means 19 may be a conventional smoothing circuit or low-pass filter consisting of resistors, inductors and capacitors.

In some cases the response of the control system is slow, that is the corrective action in response to the error or correction signal is slow. More specifically even when the error or correction signal $\pm b \times \Delta S_2$ is generated in response to the deviation $\pm \Delta S_2$ of the output of the welder and is applied to the controller means 15, the corrective action is not immediately completed in the controller means 15, the welder 16 or the welding load 17 because of the inertia of the variation in output. That is, the output of the welder cannot immediately respond to the error or correction signal which changes rapidly from time to time so that the corrective action lags behind time.

As described above, the corrective action is continued until the deviation $\Delta S_2$ of the welder output is reduced to be negligible. Therefore, when the corrective action lags behind time the control system starts to oscillate, that is the output of the welder machine starts to oscillate. To overcome this problem the delay means 18 is inserted in the second embodiment shown in FIG. 3.

When the output of the welder changes rapidly from time to time, the output signal S of the operational amplifier 14 applied to the controller means 15 also changes rapidly. However the delay means 18 interconnected between the operational amplifier 14 and the controller means 15 serves to delay or dampen the correction or error signal S. Therefore oscillation may be prevented and the controlled output may immediately reach the set point in a stable manner.

The delay means 18 may be a conventional delay and smoothing circuit consisting of resistors, inductors and capacitors or a signal transmission circuit comprising a servomotor having a large time-constant.

Moreover the stable output control may be accomplished when the time constant of the delay means 18 is selected so as to be equl to or greater than that of the variation in output of the welder.

It will be understood that the present invention is not limited to the first and second embodiments described with reference to FIGS. 2 and 3. The arrangements and the flows of the signals in the first and second embodiments are simplified in FIGS. 2 and 3 for the sake of explanation. In practice a plurality of set point signals $S_{1n}$, where $n$ is equal to 1 to $n$, a plurality of welder output setting signals $S_{0n}$, where $n$ is equal to 1 to $n$, and a plurality of feedback signals $S_{2n}$, where $n$ is equal to 1 to $n$ may be applied arbitrarily to the input terminals of the operational amplifier 14 depending upon a desired output control. Furthermore, instead of the two input signals $S_1$ and $S_0$, one common signal combining these two signals, and connected to a common input terminal of the circuit 13 may be employed, in accordance with the above-discussed principles of operation of the invention. In the adder-subtractor circuit 13 shown in FIGS. 2 and 3, the input impedances $Z_1$-$Z_n$ coupled to the input terminals $P_1$-$P_n$ respectively have been shown as being equal to the impedances $Z_1$-$Z_n$ coupled to the input terminals $q_1$-$q_n$ respectively, but these and other impedances $Z_0$ may be arbitrarily selected in order to derive a desired output of the operational amplifier 14.

So far, the adder-subtractor circuit 13 has been described as incorporating only one operational amplifier 14, but a plurality of signal-input type operational amplifiers may be used or the combination of an adder and a subtractor may be combined. Furthermore, the polarities of the input and output signals may be arbitrarily selected depending upon a desired feedback control. The control system may include a positive feedback loop as far as the overall stability of the control system may be maintained.

As described above the welder control device in accordance with the present invention is very simple in construction and is capable of the feedback control so as to provide a stable welder output.

What is claimed is:

1. An output control device for an electric welder, comprising
   (a) an adder-subtractor circuit comprising a differential type operational amplifier and having first, second and third input terminals connected to said amplifier, and an output terminal for providing an output signal S,
   (b) first signal generating means coupled to said first input terminal for applying thereto a signal $S_1$ indicating a desired output of an electric welder,
   (c) second signal generating means coupled to said second input terminal for continuously applying thereto a signal $S_0$ for setting the open-loop initial transient output of said electric welder to approximate the desired steady state operating output of said welder,
   (d) controller means connected to receive the output voltage S of said adder-subtractor circuit so as to control the output of said electric welder,
   (e) means for coupling said electric welder to said output control device,
   (f) means associated with said welder to provide an output signal $S_2$ corresponding to the actual output of said welder which is to be controlled by said device,
   (g) feedback means connected to feed back the signal $S_2$ from an output terminal of said electric welder to said third input terminal, the output S of said adder-subtractor circuit being so selected as to be $S = aS_0 + b(S_1 - S_2)$, where $a$ is the ratio of the output $S$ of said adder-subtractor circuit to the input signal $S_0$ in the absence of other input signals to the adder-subtractor circuit which is applied to said second input terminal and is less than a level at which said operational amplifier is saturated and $b$ is a ratio of said output $S$ to the input signals $S_1$ and $S_2$ in the absence of other input singals to the adder-subtractor circuit applied to said first and third input terminals respectively, whereby the closed-loop steadystate output of said electric welder may be controlled in response to said output $S$ of said adder-subtractor circuit and
   (h) switching means for initially precluding closed-loop operation of said welder and subsequently enabling said feedback means by said signals $S_1$ and $S_2$ to said first and third input terminals respectively, only when a welding arc is struck, said signal $S_0$ continuing to be applied to said second input terminal after the arc is struck.

2. An output control device for an electric welding as defined in claim 1 further comprising
   (a) feedback signal smoothing means inserted in said feedback means, and
   (b) delay means interconnected between the output terminal of said adder-subtractor circuit and the input terminal of said controller means.

* * * * *